United States Patent
Specht et al.

(10) Patent No.: US 12,126,232 B2
(45) Date of Patent: Oct. 22, 2024

(54) METHOD FOR PRODUCING A COMPONENT HAVING A CAVITY

(71) Applicant: FRAUNHOFER-GESELLSCHAFT ZUR FOERDERUNG DER ANGEWANDTEN FORSCHUNG E.V., Munich (DE)

(72) Inventors: Uwe Specht, Bremen (DE); Michael Heuser, Bremen (DE); Malte Burchardt, Bremen (DE); Franz-Josef Woestmann, Muenster (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 1060 days.

(21) Appl. No.: 16/961,307

(22) PCT Filed: Jan. 9, 2019

(86) PCT No.: PCT/EP2019/050468
§ 371 (c)(1),
(2) Date: Jul. 10, 2020

(87) PCT Pub. No.: WO2019/137972
PCT Pub. Date: Jul. 18, 2019

(65) Prior Publication Data
US 2020/0365319 A1   Nov. 19, 2020

(30) Foreign Application Priority Data
Jan. 12, 2018   (DE) .................... 10 2018 200 505.2

(51) Int. Cl.
*H01F 7/06* (2006.01)
*B22F 7/08* (2006.01)
(Continued)

(52) U.S. Cl.
CPC ................. *H02K 3/22* (2013.01); *B22F 7/08* (2013.01); *H01F 41/041* (2013.01); *B22F 1/054* (2022.01)

(58) Field of Classification Search
CPC .... H01F 41/041; H02K 15/0407; H02K 3/14; H02K 3/22; B22F 7/08; B22F 1/054
See application file for complete search history.

(56) References Cited

U.S. PATENT DOCUMENTS

| | | | |
|---|---|---|---|
| 3,946,349 A | 3/1976 | Haldeman, III | |
| 4,629,595 A | 12/1986 | Ito | |

(Continued)

FOREIGN PATENT DOCUMENTS

| | | |
|---|---|---|
| DE | 3508794 A1 | 9/1985 |
| DE | 3508794 C2 | 6/1989 |

(Continued)

OTHER PUBLICATIONS

German Patent Office, German Examination Report, issued in the corresponding German priority application No. DE102018200505.2, Nov. 23, 2018, 9 pages, Munich, Germany.

(Continued)

*Primary Examiner* — Paul D Kim
(74) *Attorney, Agent, or Firm* — Marshall & Melhorn, LLC

(57) ABSTRACT

A method for producing an electrically conductive component having a cavity is described. An efficient production method for such a component, which allows a high variability of the wall thickness of the component, is implemented by applying a load-bearing layer consisting of an electrically conductive material to a soluble substrate and then dissolving and at least partially removing the substrate.

15 Claims, 2 Drawing Sheets

(51) Int. Cl.
  *H01F 41/04* (2006.01)
  *H02K 3/22* (2006.01)
  *B22F 1/054* (2022.01)

(56) References Cited

U.S. PATENT DOCUMENTS

| | | |
|---|---|---|
| 4,763,398 A | 8/1988 | Huizing et al. |
| 5,318,094 A | 6/1994 | Joy et al. |
| 6,859,129 B2 | 2/2005 | Tsai et al. |
| 2010/0038121 A1* | 2/2010 | Kosowsky ............... C25D 1/00 174/250 |

FOREIGN PATENT DOCUMENTS

| | | |
|---|---|---|
| DE | 102013010229 A1 | 3/2014 |
| DE | 102013112325 A1 | 5/2015 |
| EP | 0091352 A1 | 10/1983 |
| EP | 0129453 A1 | 12/1984 |
| EP | 0216421 A1 | 4/1987 |
| EP | 0129453 B1 | 9/1987 |
| EP | 0091352 B1 | 11/1988 |
| JP | S533820 U | 1/1978 |
| JP | S54141383 U | 10/1979 |
| JP | S60190317 A | 9/1985 |
| JP | H0273311 A | 3/1990 |
| JP | 2004349140 A | 12/2004 |
| JP | 2005145012 A | 6/2005 |
| JP | 2006116964 A | 5/2006 |
| JP | 2011513589 A | 4/2011 |
| JP | 2016062701 A | 4/2016 |
| JP | 2017155271 A | 9/2017 |
| WO | 92/04999 A1 | 4/1992 |

OTHER PUBLICATIONS

European Patent Office, The International Search Report with Written Opinion, issued in PCT/EP2019/050468, Mar. 28, 2019, 20 pages, European Patent Office, Rijswijk, Netherlands.

The International Bureau of WIPO, International Preliminary Report on Patentability, issued in PCT/EP2019/050468, Jul. 14, 2020, 14 pages, the International Bureau of WIPO, Geneva, Switzerland.

Japan Intellectual Property Association, Office Action in Application No. 2020-538577, dated Dec. 20, 2022, 19 pages.

Japan Patent Office, Office Action in Application No. JP2020-538577, dated Jun. 27, 2023, 12 pages.

* cited by examiner

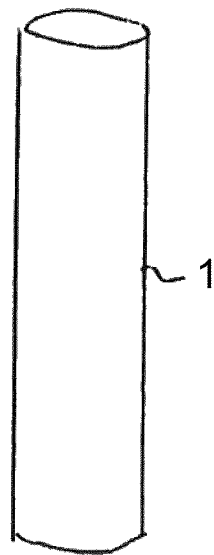
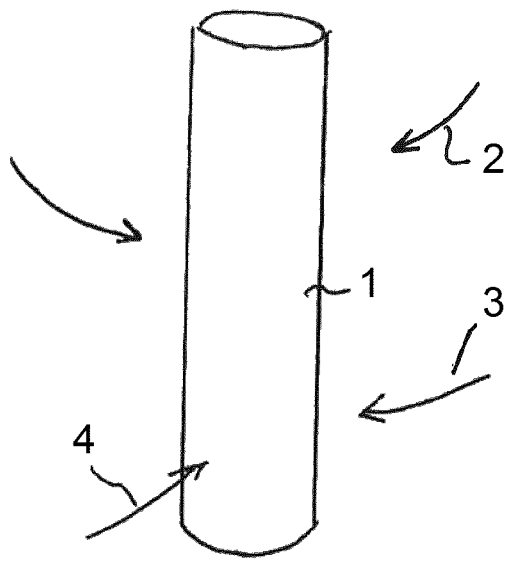
Fig. 1　　　　　　　　Fig. 2
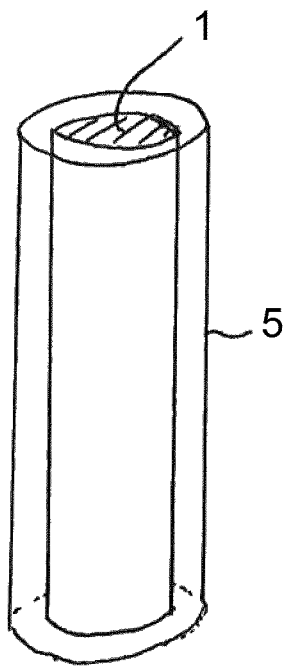
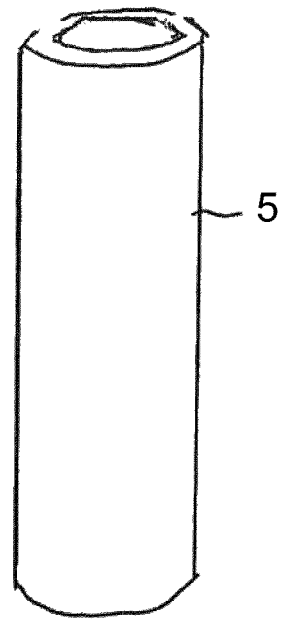
Fig. 3　　　　　　　　Fig. 4

METHOD FOR PRODUCING A COMPONENT HAVING A CAVITY

BACKGROUND

The invention resides in the field of mechanical engineering and relates to the production of electrically conductive hollow components. It can be applied particularly advantageously to the field of electrical engineering. An important application is the production of cooled passive electrical components, such as electrical conductors and, in particular, coils. Such coils can be used, for example, in the production of inverter-fed electric motors. When hollow conductors can be used during the production of such coils, efficient cooling is possible, which allows very high current densities to be achieved. The use of the invention, however, is not limited to drives or generators, for example, but it is also possible to implement other elements, such as choke coils for high-frequency circuits. A special feature during the use of hollow, electrically conductive components lies in the option to implement internal cooling therefor. Such components, however, are complex to manufacture, in particular when a small size and/or a thin wall cross-section are to be achieved. In complex shapes, the production of such components has previously only been conceivable in additive production methods (3D printing).

A production method for a straight metallic semiconductor is known from EP 0 091 352 B1, in which a substrate is coated with several metal layers, and the substrate is dissolved, so that the remaining coating forms the waveguide.

A method for producing a light conductor is known from EP 0 216 421 A1, in which initially a substrate, serving as a core, is coated and thereafter is removed from the coating. The substrate is elongated in the longitudinal direction thereof for this purpose, decreasing the cross-sectional dimensions thereof in the transverse direction in the process.

A method for producing a metallic hollow conductor is known from EP 0 129 453 B1, in which initially a core is coated with a brass layer, and thereafter with a silver layer and a copper layer, whereupon the core and the brass layer are dissolved.

The formation of a high frequency module comprising hollow conductors on or in a semiconductor wafer is known from US 2004/0036569 A1.

The production of an injection-molded body in an injection mold is known from DE 35 08 794 C2, the mold being coated, and the coating being transferred onto the molded part.

SUMMARY

Against the background of the prior art, it is the object of the present invention to create a method for producing electrically conductive components having a cavity, which allows complex shapes to be produced with little effort and costs.

The object is achieved by the features of the invention according to claim 1 by way of a method for producing an electrically conductive component. Claims 2 to 12 represent advantageous embodiments of the method.

The invention furthermore relates to a method for producing a soluble substrate for use in a method according to the invention.

The invention thus relates to a method for producing an electrically conductive component having a cavity.

The object is achieved by applying a load-carrying, fluid-tight layer made of an electrically conductive material onto a soluble substrate, in particular in a layer thickness of more than 3 micrometers, and in particular more than 20 micrometers, in such a way that the substrate is covered by the layer in a fluid-tight manner, and that thereafter the substrate is dissolved and at least partially removed.

By applying the electrically conductive material onto a substrate, the thickness and the material structure of the applied layer can be configured within broad boundaries. It is possible to achieve layer thicknesses in the process that, for example, are not achievable, or only with great difficulty, by way of common metal casting processes. By applying the layer onto the surface of a substrate, it is also possible to achieve complex shapes having undercuts, using simple application methods. The geometric design of the cavity or cavities in a component formed with such a layer can be easily configured by the shaping of the substrate. A fluid-tight layer is generated by way of the methods, which forms a closed outer wall of the component being created, so that this can be effectively cooled by way of a fluid in the cavity thereof. The use of the cavity in the component, however, is not limited to cooling, but it is also possible to implement any kind of material and heat transport, such as heating, temperature equalization or the conduction of the fluid as material transport, by a fluid that is provided in the cavity.

It may furthermore be provided that the load-carrying, fluid-tight layer is formed in a layer thickness of less than 20 mm, and in particular less than 5 mm.

In particular, thin wall thicknesses of the components can be implemented well by way of the described method.

It may furthermore be provided that the substrate has a strand-shaped design, and that the layer is applied to the lateral surface(s) of the substrate on all sides, such that the lateral surface of the substrate is covered in a fluid-tight manner.

In this way, the method can be used to produce wire-like, hollow components particularly easily.

Using the different technologies, which can be employed to apply layers onto substrates, it is possible to form thin layers in desired material structures, so that the necessary wall thickness for the component is only limited by the requirements regarding the current-carrying capacity and the fluid tightness as well as the mechanical load-carrying capacity.

For example, the substrate can be designed as a strand having any arbitrary cross-section and be covered on all sides with a fluid-tight layer using the coating method. Prior to the coating process, the substrate may already be placed into the geometry of the final coil/spiral and then be coated. The preliminary geometry may be created analogously to a winding process, wherein it still has to be possible subsequently to elastically expand or extend the preliminary geometry so that the windings do not make contact with one another and can be coated. A preliminary geometry may likewise be created by way of forming processes using semi-finished products, or by way of a process similar to fused deposition molding (FDM), in which the substrate material is brought, by way of a nozzle, into the shape of the desired coil or an approximate shape, and the individual windings are not fused to one another. In addition, the preform made of the substrate thus created may already be compressed or be formed into the desired final contour by subsequent forming, resulting in a high utilization of the available installation space for the coil when simple preliminary geometries are used for the substrate. A tubular component then remains after the substrate has been dissolved. The cross-section of the substrate can, for example, be circular or oval, or also rectangular, square, triangular or polygonal. If, for example, the component is to be produced or further processed in the form of a coil, cross-sections that allow a high number of turns are a suitable choice. After having been produced, the component may be further brought into shape, either before the substrate is removed or after the substrate is removed, for example by way of bending or winding. However, it may also be provided to produce the substrate already in an intended complex shape, so that the three-dimensional shape of the component that is used later is already predefined by the coating of the substrate.

During the production of a strand-shaped component, a continuous production process may also be provided by moving a substrate continuously through a coating device and coating the same therein. After having passed through the coating device, the coated substrate may enter a further processing station in which the substrate is dissolved. In a subsequent station, the strand-shaped body, which then has a tubular design, can then be wound, for example. In one embodiment of the invention, it may be provided that the load-carrying layer is applied to the substrate by applying particles. Such particles can be, for example, microparticles or nanoparticles or also individual atoms or clusters of atoms or material droplets, which are applied to the surface of the substrate using different methods, which will be described in greater detail hereafter.

In one embodiment of the method, it may be provided that the substrate is at least partially made of an electrically conductive material, in particular a metal or an electrically conductive plastic material, or of an electrically insulating material filled with conductive particles, such as ceramic, glass or plastic.

As a result of an at least partially electrically conductive design of the substrate, coating methods such as galvanic plating methods are possible, which may also be carried out in an electroless manner.

Other coating methods, which require a current to be generated or a voltage to be applied to the substrate, can be made possible by the electrically conducting design of the substrate.

In one embodiment of the method according to the invention, it may also be provided, for example, that the substrate is at least partially made of an electrically insulating material, in particular a plastic material, a wax, a ceramic material or a thermoplastic material.

In this way, it is possible to select freely from common, easy to process materials for creating the substrate.

It may be provided for this purpose, for example, that the substrate is pre-coated with an electrically conductive pre-coating substance, in particular with a metal, in particular in the form of microparticles or nanoparticles or a conductive plastic material or carbon, in particular in the form of graphite or carbon nanotubes, before the load-carrying layer is applied.

Such a pre-coating establishes conductivity of the surface, so that all electrical or electrically assisted coating methods are facilitated or enabled.

However, it may also be provided that the substrate is coated with microparticles or nanoparticles, which are not necessarily electrically conducting, before the load-carrying layer is applied. In this way, adhesion promotion of the subsequently applied load-carrying layer and/or improved growth of such a layer can be made possible.

This also facilitates coating methods for the substrate other than electrical or electrically assisted methods.

A suitable pre-coating can also cause the separation of the generated layer from the substrate to be facilitated in a later step.

It may also be provided that the substrate is chemically etched before the load-carrying layer is applied.

For example, it may be provided for the coating according to the invention that the load-carrying layer is applied to the substrate by way of a galvanic, in particular electrochemical or electroless method.

The advantages of the method described above are as follows:
Various metals and alloys can be used
Different metals/alloys are possible in layers
Layer thickness can be controlled via the process parameters time, temperature, voltage, current, concentration and the like
Use of chemically pure metals
Creation of defect-free/low-defect layers
Coating of complex structures+homogeneous coating (wall thickness).

Another usage option is that the hollow conductor, which is present after the coating process, together with the substrate located inside, which is still present, can be easily formed, without destroying the hollow geometry. As a result, it is possible to transpose/twist multiple conductors and only then move the substrate out of the hollow conductor. This creates a conductor for very high frequencies with low losses due to the skin effect, which enables very high current densities as a result of the possible internal cooling.

As an alternative, it may also be provided that the load-carrying layer is applied to the substrate by way of a PVD coating process.

Such physical vapor deposition (PVD) processes can, for example, encompass the following methods: thermal evaporation of substances with subsequent deposition, electron beam evaporation, laser beam evaporation, arc evaporation, molecular beam epitaxy. In addition, so-called sputtering is a coating method, in which the starting material is atomized by ion bombardment and transferred into the gas phase. In addition, ion beam-assisted deposition, ion plating and the ionized cluster beam deposition (ICBD) method can be employed.

In principle, it must be noted that it is also possible to consecutively apply multiple layers, which later form the wall of the hollow component to be produced. It is conceivable, for example, that a first layer ensures the electrical conductivity and the mechanical stability, while a layer applied thereto ensures the fluid tightness, or vice versa.

In principle it may also be provided that the load-carrying layer is applied to the substrate by way of a CVD coating process.

The chemical vapor deposition (CVD) processes shall be understood to mean chemical vapor deposition processes in which substances from the gas phase are deposited on the substrate, where they chemically react with the surface, or the materials present at the surface, for example pre-coatings, forming a layer. So as to create special shapes of the produced components, it may be provided, for example, that the load-carrying layer is applied to the substrate so as to surround the substrate in a fluid-tight manner on all sides.

Fluid tightness on all sides shall be understood to mean that the substrate is in fact completely enclosed and sealed by the coating. However, in particular in the case of strand-shaped substrates, it may also be provided that the lateral surfaces of the substrate are sealed in a completely fluid-tight manner, while at least one end face, or also multiple end faces, of the substrate remains or remain uncoated. It may also be provided, however, that the substrate is initially coated in a fluid-tight manner on all sides, and that thereafter parts of the coating are removed in a subsequent processing step, so as to first create the cavity in the produced component by removing the substrate, and then use it by adding a fluid.

It may furthermore be provided, as a coating method, that the load-carrying layer is applied to the substrate by way of a plasma spraying process or by immersing the substrate in molten metal.

In principle, it may be provided that the substrate is deformed before the load-carrying conducting layer is applied, or that the substrate is deformed together with the load-carrying conducting layer after the layer has been applied. This can be useful, in particular, when the substrate has the shape of a helix or a spiral.

For example, it may be provided that a helical or spiral-shaped substrate is created, and is extended in the longitudinal direction of the helix/spiral before the coating made of an electrically conductive material is applied, and thereupon, in particular in the extended form, is provided with the coating made of an electrically conductive material. In the extended state, an electrically insulating coating can additionally be applied to the conductive coating, for example made of a paint or plastic material or metal oxide. Thereafter, the substrate, together with the coating, may be compressed in the longitudinal direction, or, if the extension has at least partially taken place elastically and the substrate is elastic, a transition into an at least partially contracted form in the longitudinal direction of the helix may take place by relaxation of the substrate. Such a procedure may be useful, for example, when the distance between individual turns of the substrate in the de-energized state is small, for example less than 2 mm or less than 1 mm. In this way, it is possible to prevent electric contacting of adjoining turns.

In one implementation of the method, it may be provided, for example, that the substrate is deformed together with the load-carrying layer after the same has been applied, and in particular is bent, and thereafter the substrate is at least partially removed. Prior to the deformation, the load-carrying, electrically conducting layer may additionally be provided with an electrically insulating cover layer, for example by dipping, squirting, spreading, spraying or powder coating, or by applying a reaction layer, in particular an oxide layer, for example by way of a chemical treatment with a reactant.

By deforming the component together with the substrate, the cross-section of the component can be maintained in a particularly stable manner, for example during bending, in particular when the component is designed as a strand-shaped hollow electrical conductor.

It may also be provided that, after the coating has been applied, the semi-finished product comprising the substrate and the coating is deformed into a coil geometry, and is subsequently pressed, so as to calibrate a coil body for an available installation space, and achieve a planar abutment of one turn to the next of the coil body.

It may furthermore be provided that multiple electrically conductive components, which are designed as strand-shaped conductors, are twisted (transposed) with one another, together with the substrate, so as to achieve a reduction in the skin effect, wherein in particular an insulation of the conductors/electrically conducting components with respect to one another is carried out prior to or after twisting.

So as to remove the substrate from the load-carrying layer, it may be provided that the substrate is detached from the load-carrying layer by burning out, dissolution in a solvent, mechanical crushing, chemical decomposition, melting, evaporation or sublimation, and is at least partially removed.

This may take place after the substrate has been completely coated, in a subsequent process step, or also during the ongoing production of a continuous component, such as a tube, in a process step that the component continuously passes through after the coating process. The substrate may also be removed before or after a deformation, for example bending, of the component so as to create the final shape.

In a special method for producing a substrate for use in one of the above-described methods, it may be provided that the substrate is poured into a mold coated with a material that adheres to the surface of the substrate and that has such properties that it enables or facilitates the deposition and/or the adhesion of the load-carrying layer on the substrate.

In principle, the substrate may be produced as a core in an upstream molding process in simple, or also complex, shapes, wherein the methods known from molding technology can be employed. The coating of the mold used for the substrate in the described type allows this coating to be transferred to the surface of the substrate, and facilitates the coating methods employed thereafter.

BRIEF DESCRIPTION OF THE DRAWINGS

The invention will be shown and described hereafter based on figures of a drawing. In the drawings:

FIG. 1 shows a strand-shaped substrate in a perspective view,

FIG. 2 schematically shows the process of coating,

FIG. 3 shows a perspective view of a coated substrate,

FIG. 4 shows the produced component after the substrate has been removed, in a perspective view.

DETAILED DESCRIPTION

Figure 5:
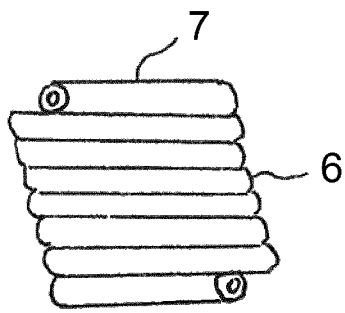
FIG. 5 shows a winding of a tubular component produced according to the invention.

FIG. 1 shows a cylindrical, strand-shaped substrate 1, which is coated within the scope of the method according to the invention. The substrate 1 is a simple example, which can be used for the production of a hollow wound wire having a hollow-cylindrical cross-section.

The substrate 1 is shown in FIG. 2, wherein arrows 2, 3, 4 indicate that particles, for example atoms, microparticles or nanoparticles or droplets, are applied from the outside onto the surface of the substrate 1. For this purpose, the substrate can optionally have a pre-coating, which can be electrically conducting, for example, so as to be able to use coating methods that require the application of a voltage, or that function, for example, as an electroless galvanic deposition.

FIG. 3 shows the substrate 1 comprising an applied load-carrying layer 5. The illustration is shown schematically, and the thickness of the layer 5 as well as the ratio of the layer thickness to the diameter of the substrate are only shown by way of example. In many cases, the thickness of the layer/coating 5 will be lower in relation to the diameter of the substrate 1.

FIG. 4 shows the end product in the form of a hollow tube 5, wherein the substrate 1 is separated from the layer/coating 5 by liquefaction, burning out or removal otherwise.

Figure 6:
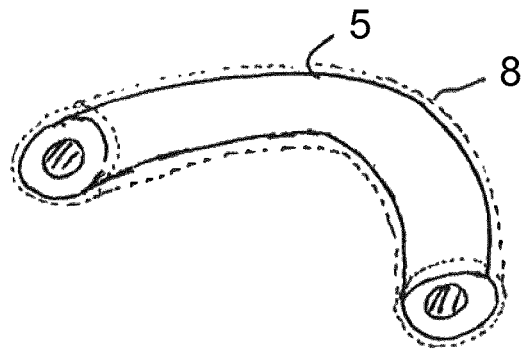
FIG. 6 shows a component that was bent prior to the removal of the substrate.

FIG. 5 shows a helical coil 6, which is composed of a bent tube 7. This can be produced in the bent shape, as shown in FIG. 5, by way of a similarly shaped substrate having a metal layer applied thereon. However, it is also possible to initially use an extended straight strand-shaped substrate, to coat it, and produce a straight tube thereby. As is shown in FIG. 6, for example, this can be bent together with the coated substrate. After the substrate, together with the coating, has been brought into the desired shape, the substrate can be removed. Such a deformation of the produced tubular component, together with the substrate still present therein, has the advantage that, during the deformation, the cross-section is preserved as a result of being supported by the substrate therein, and bending of the tubular component can be avoided. FIG. 6 optionally, in dotted form, also shows an insulating coating 8 of the electrically conducting layer 5.

However, it is also conceivable to first remove the substrate from the component, and thereafter deform the hollow component.

Figure 7:
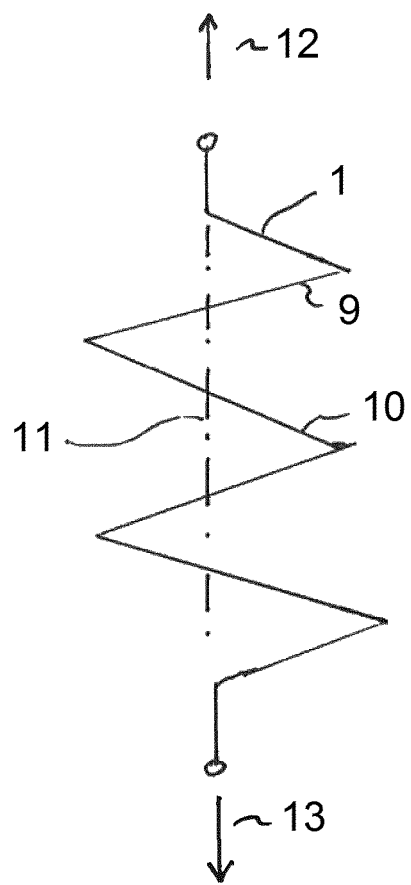
FIGS. 7 and 8 show a helical substrate in the extended and compressed states.

FIG. 7 shows a substrate in the form of a helix shown schematically in a side view, in which, in the relaxed state, the individual turns 9, 10 are located closely together. FIG. 7 shows that the substrate is being extended along the longitudinal axis 11 of the helix by tensile forces 12, 13 prior to the coating process. The substrate may consist of an elastic material, for example an elastic polymer.

Figure 8:
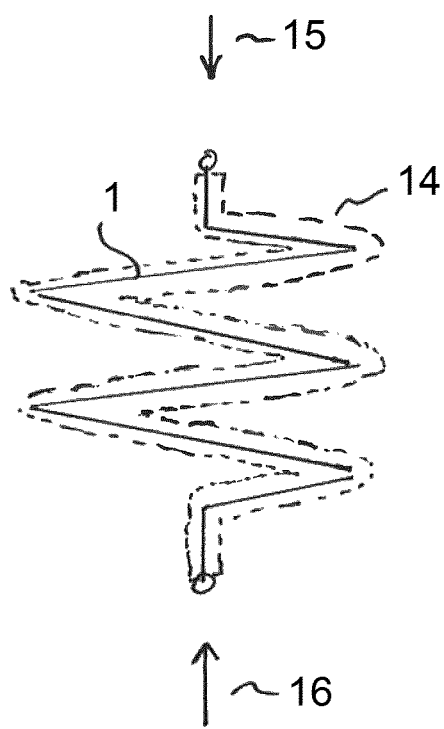

FIG. 8 shows the helix after the coating process, wherein the coating is schematically indicated by the dotted lines 14. The coating can be made of the electrically conductive, load-carrying metal layer, which later forms the conducting component. However, the coating may also comprise an electrically insulating cover layer made of a plastic material or an oxide or another material. FIG. 8 shows a compressed state in the longitudinal direction of the helix, which arises either after the tensile forces 12, 13 have been eliminated, as a result of relaxation of the substrate material, or is actively achieved by the application of compression forces 15, 16 in the longitudinal direction of the helix.

Two exemplary embodiments will be described hereafter based on specific materials.

Exemplary Embodiment 1

A wax that is suitable for producing complex structures by way of molding is mixed with a graphite. As a result, electrical conductivity is achieved in the mixture which can be controlled by the proportion of admixed graphite (for example, 1/1000 1/Ohm*cm). The resistance is selected so as to be sufficiently small for the galvanic deposition of a copper sheath on the substrate. The surface structure of the wax-like substrate can also be influenced by the manner in which graphite is admixed. By configuring the surface structure of the substrate, for example setting a particular roughness or unevenness, this shape is transferred to the inner surface of the component formed by the applied layer, so that the flow behavior of a fluid through the hollow component can also be determined.

A copper sulfate solution can be used for the galvanic deposition, and the component is cathodically polarized. By way of the deposition parameters, the layer thickness of the copper sheath can be varied in a wide range between a few micrometers up to several millimeters.

After the copper has been deposited, the wax of the substrate is melted out at 120° C. and thus removed.

Exemplary Embodiment 2

A complex geometric shape of a substrate can initially be produced in a wax injection molding process or by way of a forming process from a tool. In addition to the use of injection molding processes, cutting processes are also conceivable, alternatively and/or additionally.

The substrate created in this way can be provided with a thin layer of platinum or palladium in a sputtering process so as to create electrical conductivity of the surface of the substrate. Thereupon, the substrate can be galvanically coated with copper. In a subsequent step, the wax/substrate can be melted out of the component by heating.

The invention makes it possible to produce metallic components that have complex shapes and an inner hollow space, for example in the form of a longitudinal channel, and a variably settable wall thickness. The metallic coating can be carried out using pure metals, such as highest-purity copper or aluminum, so that the best electrical conductivity levels can be achieved. Such materials cannot be easily processed in casting processes or forming processes, without risking damage to the structure, which, among other things, can also result in leakage.

By way of the method, it is possible to produce tools that are coated with metal from profiled wires, which are cut to the proper dimension in a subsequent process step, and brought by way of forming into the desired geometry, such as a coil.

It is possible to produce coils or windings, in particular during the production of internally cooled electrical conductors, which enable a considerably increased current density compared to coils/windings of the prior art. In this way, mechanical drives having increased torque density, for example, can be made possible.

The invention claimed is:

1. A method for producing an electrically conductive component having a cavity, comprising:
applying a load-carrying, fluid-tight layer made of an electrically conductive material onto a soluble substrate by applying particles to the substrate, wherein said application of said layer is a thickness of more than 3 micrometers, including more than 20 micrometers, in such a way that the substrate is covered by the layer in a fluid-tight manner, and that thereafter the substrate is dissolved and at least partially removed,
further comprising that after the load-carrying, fluid tight layer has been applied, a semi-finished product comprising the substrate and the load-carrying, fluid tight layer is deformed into a coil geometry, and is subsequently pressed, so as to calibrate a coil body for an available installation space, and achieve a planar abutment of one turn to the next of the coil body.

2. The method according to claim 1, further comprising forming the load-carrying, fluid-tight layer in the layer thickness of less than 20 mm, including less than 5 mm.

3. The method according to claim 1, further comprising providing the substrate with a strand-shaped design, and applying the layer to the lateral surface(s) of the substrate on all sides, such that the lateral surface(s) of the substrate is or are covered in a fluid-tight manner.

4. The method according to claim 1, further comprising at least partially making the substrate of an electrically conductive material, including a metal or an electrically conductive plastic material, or of an electrically insulating material filled with conductive particles.

5. The method according to claim 1, further comprising at least partially making the substrate of an electrically insulating material, including a plastic material, a wax, a ceramic material or a thermoplastic material.

6. The method according to claim 1, further comprising pre-coating the substrate with an electrically conductive pre-coating substance, including a metal, including a metal in the form of microparticles or nanoparticles or a conductive plastic material or carbon, including carbon in the form of graphite or carbon nanotubes, before the load-carrying layer is applied.

7. The method according to claim 1, further comprising applying the load-carrying layer to the substrate by way of a galvanic, including an electrochemical or electroless galvanic method, a PVD coating method, or a CVD coating method.

8. The method according to claim 1, further comprising applying the load-carrying layer to the substrate by way of a plasma spraying process or by immersing the substrate in molten metal.

9. The method according to claim 1, further comprising applying the load-carrying layer to the substrate so as to surround the substrate in a fluid-tight manner on all sides.

10. The method according to claim 1, further comprising detaching the substrate from the load-carrying layer by burning out, dissolution in a solvent, mechanical crushing, chemical decomposition, melting, evaporation or sublimation, and is at least partially removed.

11. The method according to claim 1, further comprising deforming the substrate together with the load-carrying layer after the same has been applied, and including being bent, and thereafter the substrate is at least partially removed.

12. The method according to claim 1, further comprising creating a helical substrate and extending the helical substrate in the longitudinal direction of the helices before the coating is applied, and thereupon is provided with the coating.

13. The method according to claim 1, further comprising deforming, or processing by way of forming, a semi-finished product comprising the substrate and the load-carrying, fluid tight layer after the load-carrying, fluid tight layer has been applied to the substrate.

14. The method according to claim 1, further comprising twisting or transposing multiple electrically conductive components, which are designed as strand-shaped conductors, with one another, together with the substrate, so as to achieve a reduction in the skin effect, including an insulation of the electrically conducting components with respect to one another being carried out prior to or after the twisting.

15. The method for according to claim 1, further comprising pouring the substrate into a mold coated with a material that adheres to a surface of the substrate and that has such properties so as to enable or facilitate a deposition and/or an adhesion of the load-carrying layer on the substrate.

* * * * *